(12) United States Patent
Coon

(10) Patent No.: US 6,266,212 B1
(45) Date of Patent: *Jul. 24, 2001

(54) HIGH SHOCK SUSPENSION WITH TETHERED FLEXURE TONGUE

(75) Inventor: Warren Coon, Temecula, CA (US)

(73) Assignee: Magnecomp Corp., Temecula, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 09/179,801

(22) Filed: Oct. 27, 1998

Related U.S. Application Data

(60) Provisional application No. 60/063,411, filed on Oct. 28, 1997.

(51) Int. Cl.[7] ................................ G11B 17/32; G11B 5/48

(52) U.S. Cl. .................................. 360/234.5; 360/245.7
(58) Field of Search .................................. 360/103–104, 360/234.5, 244.2, 245.7, 245.8

(56) References Cited

FOREIGN PATENT DOCUMENTS

| 6-28802 | * | 2/1994 | (JP) | ................................ | 360/104 |
| 6-168555 | * | 6/1994 | (JP) | ................................ | 360/104 |
| 6-195851 | * | 7/1994 | (JP) | ................................ | 360/104 |

* cited by examiner

*Primary Examiner*—Allen T. Cao
(74) *Attorney, Agent, or Firm*—Louis J. Bachand

(57) ABSTRACT

A disk drive suspension load beam suspension comprising a load beam and a flexure has an elongatable portion on the flexure frame attached to the flexure tongue tip for elongation by flexure tongue movement such that the flexure tongue is tethered against unduly large excursions but free to gimbal in the normal way as well.

19 Claims, 5 Drawing Sheets

HIGH SHOCK SUSPENSION WITH TETHERED FLEXURE TONGUE

RELATED APPLICATION

This application claims the benefit of United States Provisional Application, Ser. No. 60/063,411 filed Oct. 28, 1997.

TECHNICAL FIELD

The present invention relates to disk drive suspensions, and more particularly to disk drive suspensions in which the flexure tongue is tethered to the flexure against unwanted excursions by the flexure tongue in operation of the disk drive suspension.

RELATED ART

Disk drive suspensions comprise a load beam mounted to an actuator, the load beam having a base portion which is mounted to the actuator, a spring portion which exerts the desired suspension pre-load, and a rigid portion generally projecting from the spring portion. The rigid portion of the load beam carries relatively more compliant member termed a flexure. Typically the flexure comprises a relatively less compliant portion called the frame or "outrigger" portion, and a relatively more compliant portion called the tongue; the tongue being generally cantilevered from the flexure frame. A slider and head, herein referred to as a slider, is carried by the flexure tongue, the tongue itself being in dimple contact with the load beam to enable various attitudes of the tongue and slider combination above the disk drive disk.

SUMMARY OF THE INVENTION

Keeping the slider from unwanted contact with the disk is a major desideratum in suspension load beam design. Because the flexure tongue is by necessity highly flexible occasions may arise when the excursions of the flexure tongue and its associated slider are too great and there is contact between the slider and disk. Various solutions including reducing the easy flexibility of the tongue or blocking necessary movements of the tongue are counterproductive. The need is to retain all the properties of the flexure tongue and yet limit unduly extended excursions of the tongue and its slider. It is an object of this invention to provide apparatus and method which modifies the disk drive suspension in a manner to limit undue excursions of the flexure tongue, and yet retains the desirable properties of the flexure and flexure tongue.

This and other objects of the invention are realized in a disk drive suspension comprising a load beam having a base for attachment to an actuator, a spring portion and a rigid portion, a flexure attached to the load beam rigid portion, the flexure comprising an outrigger defining frame and a tongue having a proximate end and a distal end, the flexure tongue proximate end being attached to the frame and movable therewith, the tongue distal end being movable independent of the flexure frame over a desired excursion range, and a tether connecting the tongue portion distal end to the flexure frame in excursion limiting relation beyond the desired range.

In this and like embodiments, typically, the tether comprises a flexible connection between the flexure tongue distal end and the flexure frame, the flexibility of the connection being limited to block tongue distal end excursions beyond the desired range; the tether comprises a flexible connection anchored to the flexure frame and the tongue distal end in blocking relation to distal end excursions beyond the desired range; the tether comprises a portion of the flexure frame constructed and arranged to elongate in response to flexure frame-independent movement of the tongue distal end within the desired range; the flexure frame, flexure tongue, and tether comprise portions of a unitary web of spring steel; and/or the excursion range subtends an angle of 0 to 3 degrees.

In a further embodiment, the invention provides a disk drive suspension comprising a load beam having a base for attachment to an actuator, a spring portion and a rigid portion therebeyond, a flexure frame attached to the load beam rigid portion, a flexure tongue having a proximate end attached to the flexure frame and a distal end, the tongue distal end being movable independent of the flexure frame over a desired excursion range, and a tether connecting the tongue portion distal end to the flexure frame in excursion limiting relation beyond the desired range.

In this and like embodiments, typically, the tether comprises a separately defined portion of the flexure frame, the flexure frame portion has a first dimension within the a flexure frame and is constructed and arranged to elongate beyond its the first dimension in response to movement of the tongue distal end through its excursion range; the tether comprises a separately defined portion of the flexure frame, is sinuous along its length in the plane of the flexure frame for elongation as needed to tether the tongue distal end; the tether comprises a separately defined portion of the flexure frame, is locally bifurcated into at least two segments, the tether segments being separated along at least a portion of the length of the tether in the plane of the flexure frame to effectively shorten the length of the tether in the plane of the flexure from its elongated length out of the plane of the flexure; the tether comprising a separately defined portion of the flexure frame has a locally deflected shape having a length $L_2$ but extending over a shorter length $L_1$ within the plane of the flexure frame, the tether being elongatable to extend to its length $L_2$ out of the plane of the flexure frame in response to excursions of the tongue distal end in tether connected relation; the tether comprises a flexible connection between the flexure tongue distal end and the flexure frame, the flexibility of the connection being limited to block tongue distal end excursions beyond the desired range; the tether is free of interconnection with the load beam beyond the flexure frame; the flexure frame, flexure tongue, and tether comprise portions of a unitary web of spring steel; and/or the excursion range subtends an angle of 0 to 3 degrees.

In a further embodiment the invention provides a disk drive suspension flexure comprising a frame and a tongue having a proximate end and a distal end, the flexure defining a tether attached to the tongue distal portion, the tether comprising a separately movable section of the flexure frame. In this and like embodiments, typically, the tether is locally deflected within the plane of the flexure to have a length $L_2$ extending over a shorter length $L_1$, the tether being elongatable to extend its length $L_2$ out of the plane of the flexure frame in response to excursions of the tongue distal end.

In its method aspects, the invention provides the method of limiting flexure tongue excursions from a flexure frame to within a desired range, including defining an elongatable section within the flexure frame, attaching the section to the flexure tongue portion undergoing the greatest excursions, and elongating the flexure frame section in response to tongue excursions to no more than the maximum elongation of the flexure frame section.

THE DRAWINGS

The invention will be further described in conjunction with the attached drawings in which.

DETAILED DESCRIPTION

Figure 1:
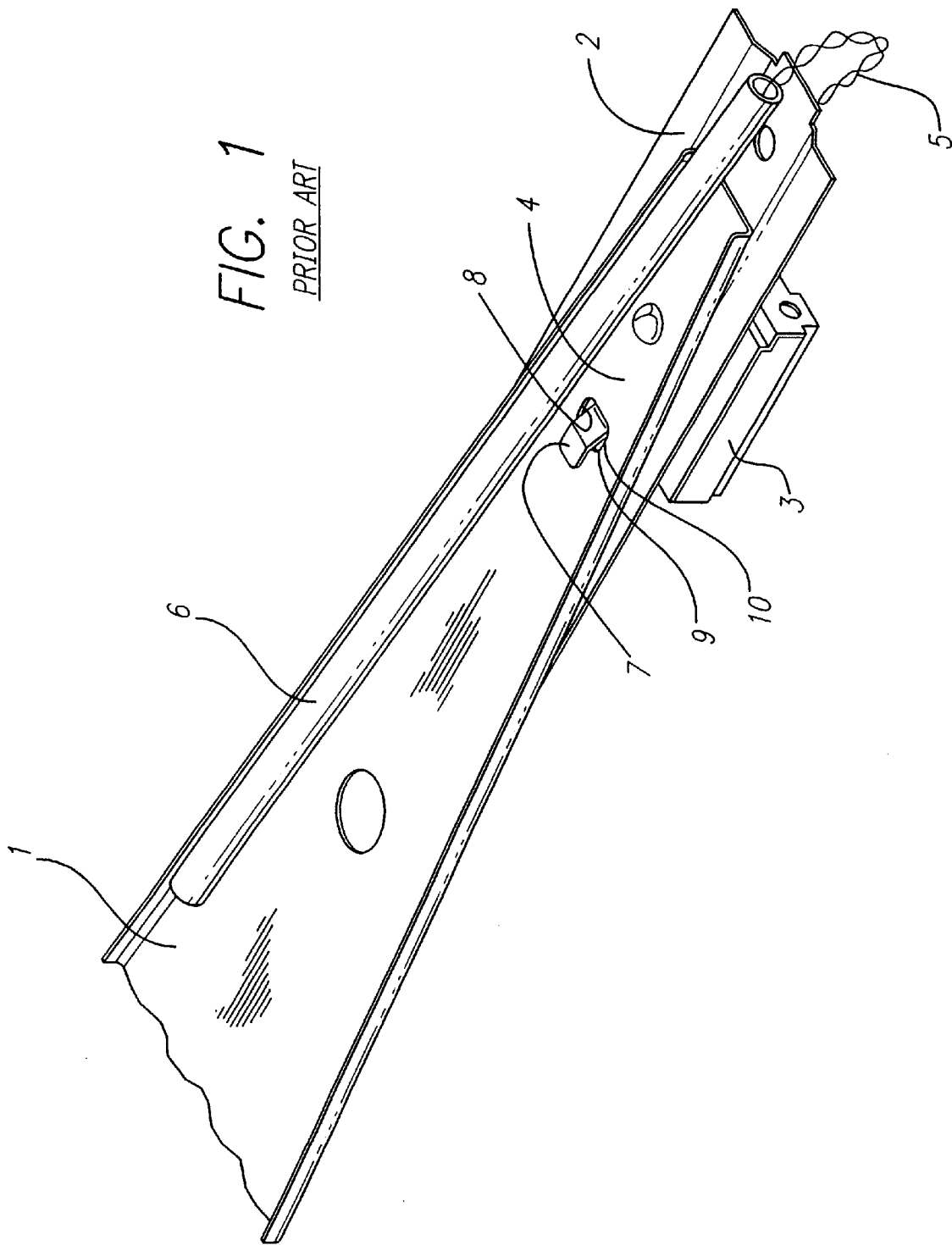
FIG. 1 is a perspective view of a prior art suspension and flexure tongue slider with rigid limiter.

The current way of building disk drive head assemblies is to use an actuator, which is a machined casting with attachment features for mounting head gimbal assemblies (HGAs). An actuator with the HGAs installed on it is referred to as a HSA (Head Stack Assembly). The HSA is driven by a voice coil or solenoid to rotate about a shaft; this rotation allows the HGAs to move sideways in an arc in such a way that the slider (including the head) at the very end of the HGA can move from track cylinder to track cylinder as required to access all the information on the recording disk. Cylinders of data on the disk are analogous to the spiral groove for a phonograph record, and the disk drive assembly to the tone arm. The slider and head arrangement is analogous to the phonograph needle.

Typically, a disk drive suspension which is the "gimbal" in a Head Gimbal Assembly includes a flexure which has as positive attributes low stiffness in the pitch and roll axes, and high stiffness in lateral mode (translation). This is because the slider carried head must follow the contours of the disk waviness with a "soft" spring action and yet be able to accept high lateral acceleration input from the actuator to change track cylinders. The industry is able to provide suspensions that meet this set of requirements with present designs being built in production.

As computers evolved using less power, and as disk drives followed the same trend, the capability of having battery-powered notebook and laptop sized computers became a reality. In addition, there is also demand for other specialized portable equipment that requires data storage. Examples are digital cameras, test equipment for autos and aviation, oil well logging, and myriad other applications. These devices can all function to some extent with miniature battery versions of existing desktop computer products. What is different about these applications is that they all have more potential for damage to the disk drive from shock that a desktop installation would have. Damage occurs when the equipment is unintentionally dropped, or from its use or installation at a site where shock is unavoidable such as a boat or airplane, or it is installed on a vibrating piece of equipment, such as motorized equipment.

These trends translate to a demand for disk drives that can survive shock during use and during storage (non-use). The same soft springing that allows the flexure/slider to follow the disk waviness allows the flexure/slider to move freely during the airborne portion of the shock cycle. When a disk drive head assembly is subjected to shock loading, the slider will lift off the disk if the (e.g. upward, say) shock is high enough to overcome the (downward) compressive force the load beam applies through the flexure to hold the slider against the disk. The slider then can move freely relative to the disk instead of being held against the disk, as it would be during lesser shock events. With many present designs, the force applied by the load beam is enough to maintain close contact between the slider and the disk through shocks of up to several hundred "g" s. That is, one could expect the suspension to stay substantially in contact with the disk up to a vertically imposed shock load of 250 times the force of gravity. While this seems to be a large number, it is not as high as the shock experienced by a computer dropping from a tabletop onto a hard floor.

The ability of a suspension to perform under shock conditions can be improved up by reducing the mass of the slider, flexure, and load beam, and by increasing the gram load applied against the disk. Of these things, the gram load cannot easily be increased; indeed the trend is toward lower gram load as the slider becomes smaller so the contact pressure (grams per unit slider contact area) does not become too high to reduce life. The load beam mass is approaching minimum possible with the length constraint in force now. The use of partial etch and tapered shapes is already common and more progress is that direction is limited. For example, tapered shapes trade away some sway mode high frequency, a very desirable feature, to achieve improved shock. So the approach of improving the load beam appears to be close to being fully utilized, especially given the constraints of form factor or the size the piece is supposed to be.

Going to a smaller slider with less mass will, from a shock standpoint, only help a little because the load beam force will be reduced in proportion to its new smaller size, and because the sliders cannot get very much smaller and still allow for electrical contact pads.

Another approach has been to control the travel of the flexure. Control, exerted by lifting or limiting the flexure travel from the tip, is appropriate primarily for low vertical accelerations. In situations of high acceleration, the mass suspended on the flexure tongue can deflect the flexure enough to cause the slider to move outside acceptable limits. In these designs, the flexure travel is limited from the weld area to the tip, but it is not limited from the tip to the flexure tongue. Further, the suspension assembly process in such cases is made more difficult because the strips making up the load beams and flexures cannot be layered into position on the welding fixture. Rather, the frets of load beams and flexures must be registered in exact relative and absolute position as the weld fixture is loaded.

The present invention features a flexure design that tethers the flexure so that the flexure tongue travel is limited relative to the outriggers. The flexure design may be used with or without added physical limiters at the flexure tip. If used without such limiters, advantageously, no registration of the fret is required during the suspension weld assembly cycle.

In the invention, the flexure has an extensible, small cross section ribbon or flexible beam that connects the tongue by its tip or distal end, to the surrounding frame outriggers to limit by its range of extensibility the movement of the load beam tongue distal end. The flexible ribbon or beam taught herein has minimal effect on the motion of the tongue within a certain range of motion, termed herein the desired excursion, but blocks motion beyond this range by literally arresting further motion. Any effect on the tongue motion can be compensated for by adjusting the stiffness of the tongue and/or the frame outriggers to achieve a zero net effect addition to the flexure. The attached drawings show different configuration embodiments. In designing parts according to the invention, the desired excursion distance, or travel distance allowable, e.g. 1–3 degrees from the plane of the load beam center axis, is established, then the length of the tether and the location of the tether attachment point required to enforce that limit is determined. In manufacture, the required length of tether is laid out in an etchable form to be etched with the flexure, per se, to form the tether with no additional part cost or process steps. Since the tether is laid out in the plane of the flexure, and it is intended to permit excursion of the flexure tongue to a position several degrees from the flexure plane, the tether as laid out in the plane of the flexure will be extensible or elongatable to a second overall length from its original length in the flexure plane. To build in the ability to elongate out of the flexure plane, the tether is sinuous, or otherwise deflected left and right, or elliptical, or otherwise fashioned such that it will be able to extend or elongate once separated from the flexure plane to accommodate the desired excursion of the flexure tongue.

A reasonable starting point would be to say that an ideal flexure would have a constant spring rate (stiffness) for angular stroke up to a predetermined angle and then have a very much stiffer rate after that (even infinite stiffness, which would be a hard stop.) The normal angle required to compensate for tolerance buildup in the stack can be computed easily for each application; for example it would be about ½ degree or less. (0.005 offset suspension can be another ¾ degree from nominal and still be within specification). So, in this example, 1½ degrees of angular stroke is needed for a perfectly flat disk supporting a perfectly installed slider in a production tolerance stack. Allow another 1¾ degrees for unidentified other errors and disk waviness and you get a total of 3 degrees of angular stroke (plus or minus three degrees) as a safe estimate of the requirement.

Therefore, a tether would be suitable if it applied a large increase in stiffness after the required excursion for each instance is calculated and applied to the flat pattern design.

The advantages of this approach are:
1. No added cost of material or assembly labor
2. Travel allowed is controlled by the flat pattern layout (design engineer) instead of manufacturing process (the assembly operator). More uniform results are obtained.
3. Invention can be retrofitted to existing designs easily with no tooling impact except for artwork of the etched part.
4. The design has only a nominal effect of twisting of the flexure load beam on its longitudinal axis.

The flexure can be of metal or combinations of metal and plastic film. In the former case the tether is comprised of spring steel used to fashion the flexure outriggers and tongue, and is in fact etched from the outrigger portion of the flexure. Where the flexure is a composite of plastic film, conductor and spring steel, the tether can be formed of the spring steel, the film or the spring steel and the plastic film.

With reference now to the drawings, in FIG. 1, a prior art suspension is shown having a load beam 1, a flexure 2, a slider 3 carried by the flexure on a tongue 4, and electrical leads 5 disposed in tube 6. Limiter tab 7 extends from the tip of the flexure tongue 4 through slot 8 in the load beam allowing or blocking flexure tongue movement depending on the gap 9 between the limiter and the slot wall 10. This arrangement requires the flexure tongue 4 to extend farther than may otherwise be desired, to carry the limiter tab 7 in cantilevered fashion with possible adverse effect on the movement of the flexure tongue 4, and given the rectangular shape of the limiter tab 7 and the corresponding shape of the slot 8, rotation of the flexure tongue on its longitudinal axis (twisting) may be blocked with consequent loss of response faithfulness of the flexure tongue to the movements of the slider. Moreover, the installation of the flexure tongue carried limiter is problematical during manufacture.

Figure 2:
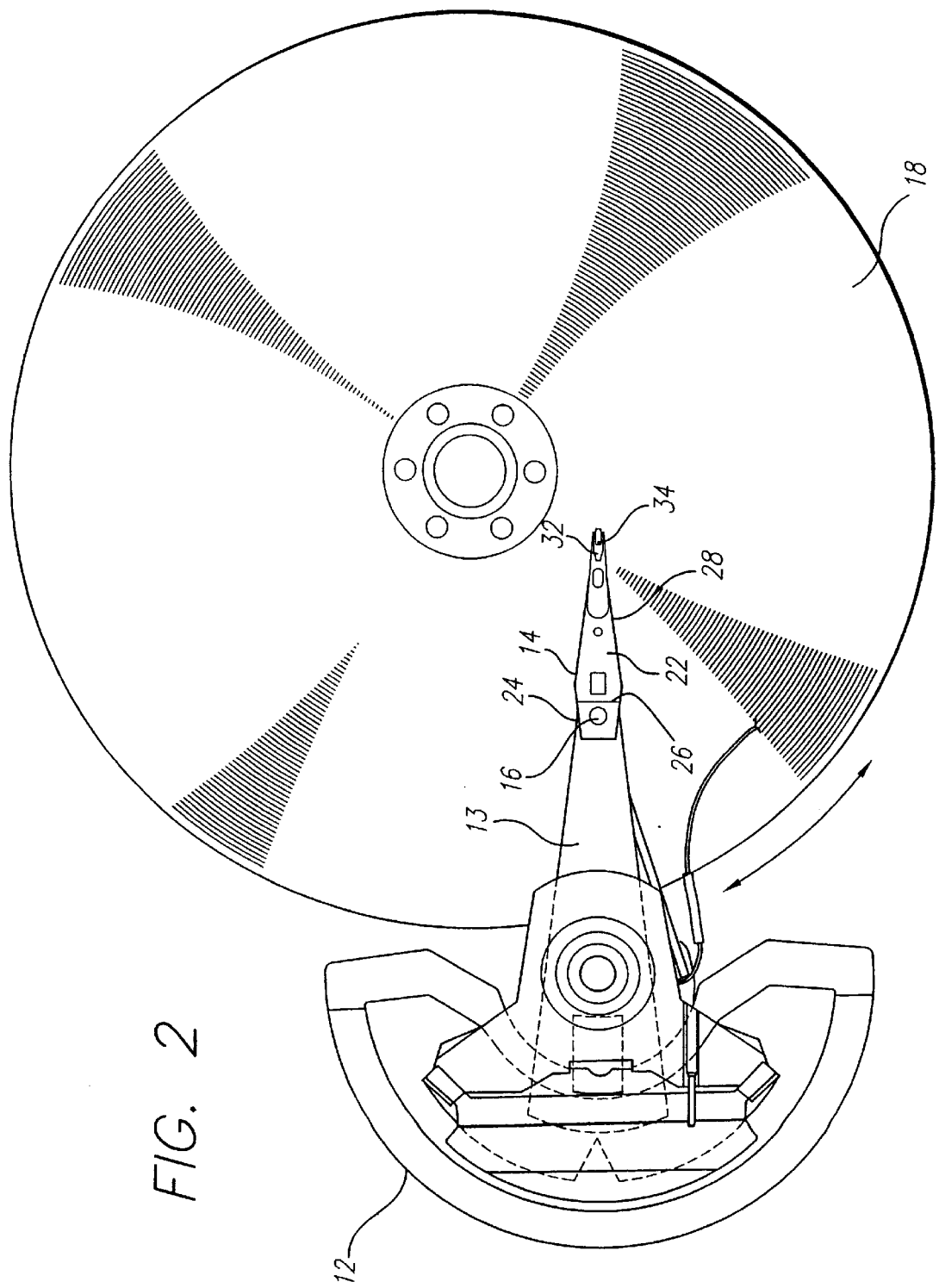
FIG. 2 is a plan view of a suspension according to the invention.

The general arrangement of the disk drive and suspension of the invention is shown in FIG. 2. There, actuator 12 coupled by arm 13 to the suspension 14 by mounting plate 16 serves to drive the suspension relative to the disk 18. The suspension 14 comprises the load beam 22 having a base portion 24 which is coupled to the actuator 12 by the mounting plate 16, a spring portion 26, and a rigid portion 28 that carries a flexure 32 and a slider 34.

Figure 3:
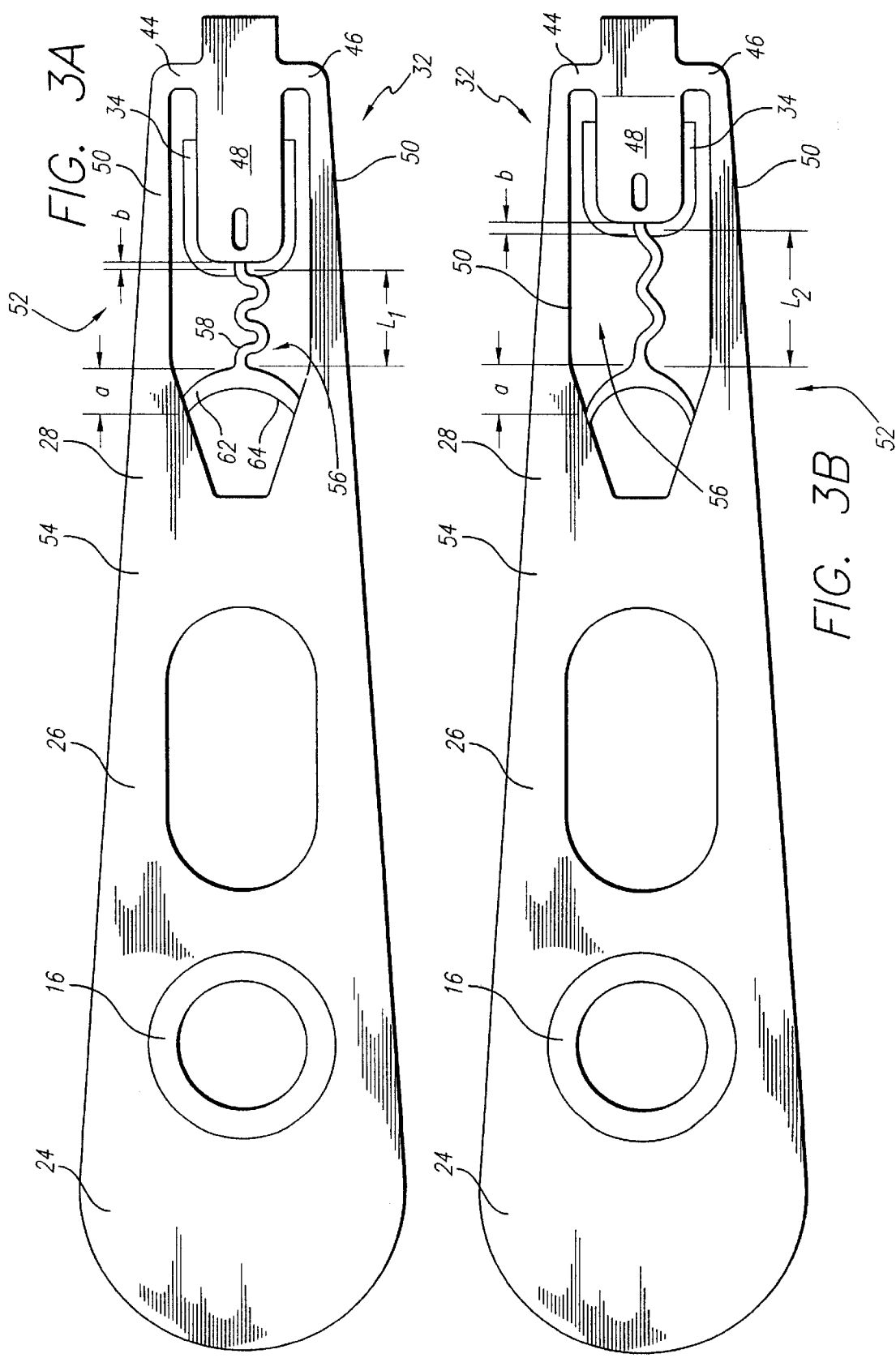
FIG. 3A is a plan view of the invention with the flexure tongue in the unextended condition.
FIG. 3B is a view like FIG. 3A showing the flexure tongue in an extended condition, limited by the invention tether limiter.

With reference to FIGS. 3A and 3B the load beam 22 is shown with like parts having like numerals to the other Figures. The distal end 42 of the load beam 22 is formed to define a flexure 32 supported by cross-pieces 44, 46 and a tongue portion 48 that extends between the left and right sections 50 of the outrigger frame 52 defined by the load beam 22. These parts are typically etched from a unitary metal body 54. In FIG. 3A the free end of the tongue portion 48 is shown connected to a tether 56 comprising in this embodiment a sinuous band 58 of metal suitable shaped by etching from the main body 54 of the load beam 22. In the present embodiment the tether 56 is locally bifurcated into at least two segments 62, 64. The tether segments 62, 64 are separated along at least a portion of the length of the tether 56 suitably in the plane of the flexure outrigger frame 52 to effectively shorten the length of the tether in the plane of the flexure from its elongated length out of the plane of the flexure. See FIG. 3A.

With reference to FIG. 3A the sinuous band 58 of the tether 56 elongates to accommodate the excursion of the flexure tongue portion 48 out of the plane of the outrigger frame 52. The excursion is limited by the length of the elongated tether 56 and effectively blocks undue excursions of the flexure tongue portion. This limiting of movement of the flexure tongue portion 48 is accomplished without use of a tab and slot arrangement, without limiting rotational (twisting) motion of the flexure tongue portion, and without assembly problems as the entire system is simply etched from a single body of metal.

Figure 4:
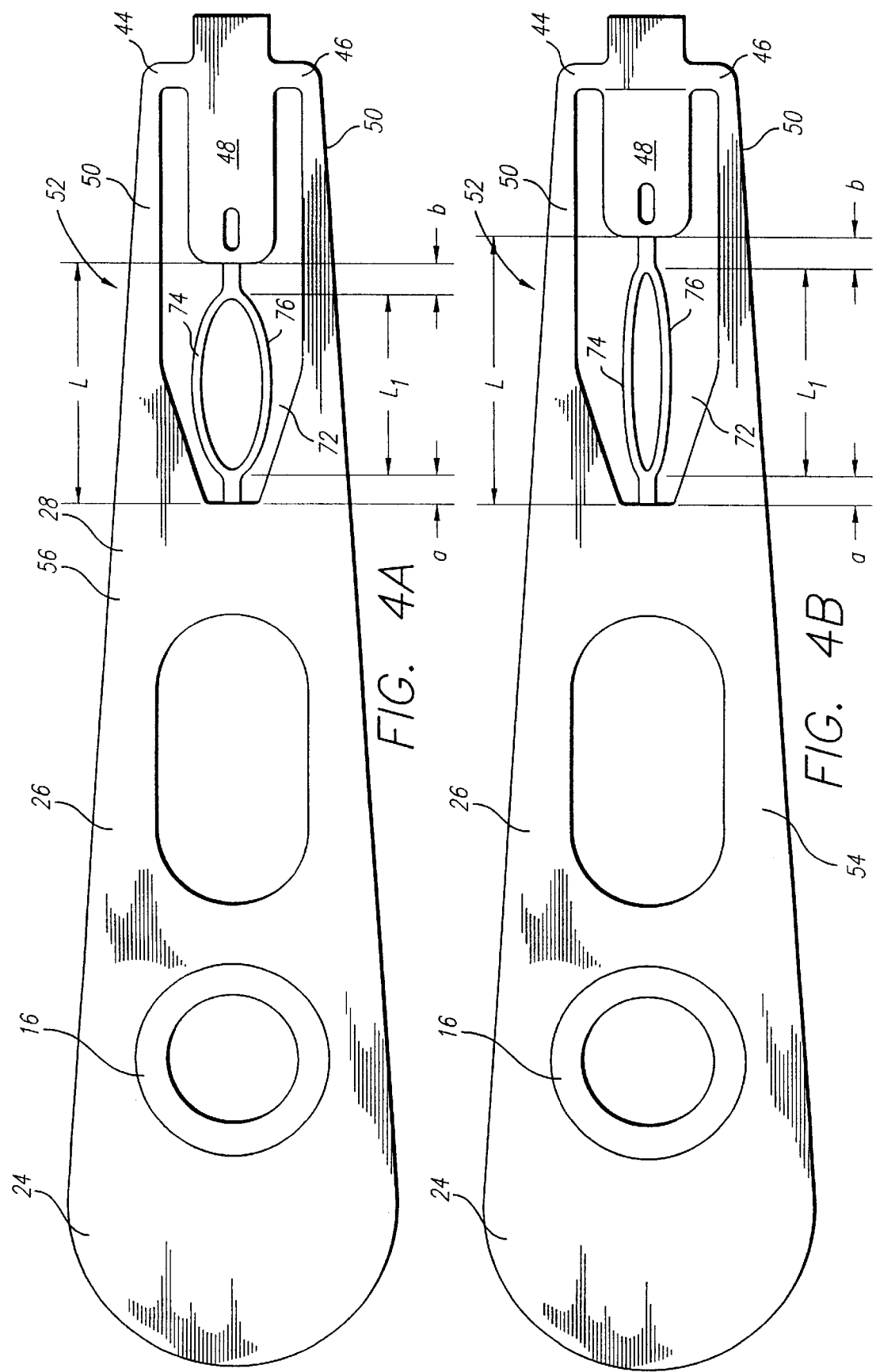
FIG. 4A is a view like FIG. 3A of an alternate form of the invention.
FIG. 4B is a view like FIG. 3B of the alternate form of the invention shown in FIG. 4A; and, FIG. 5 is a schematic view of the flexure and tether operation.
Figure 5:
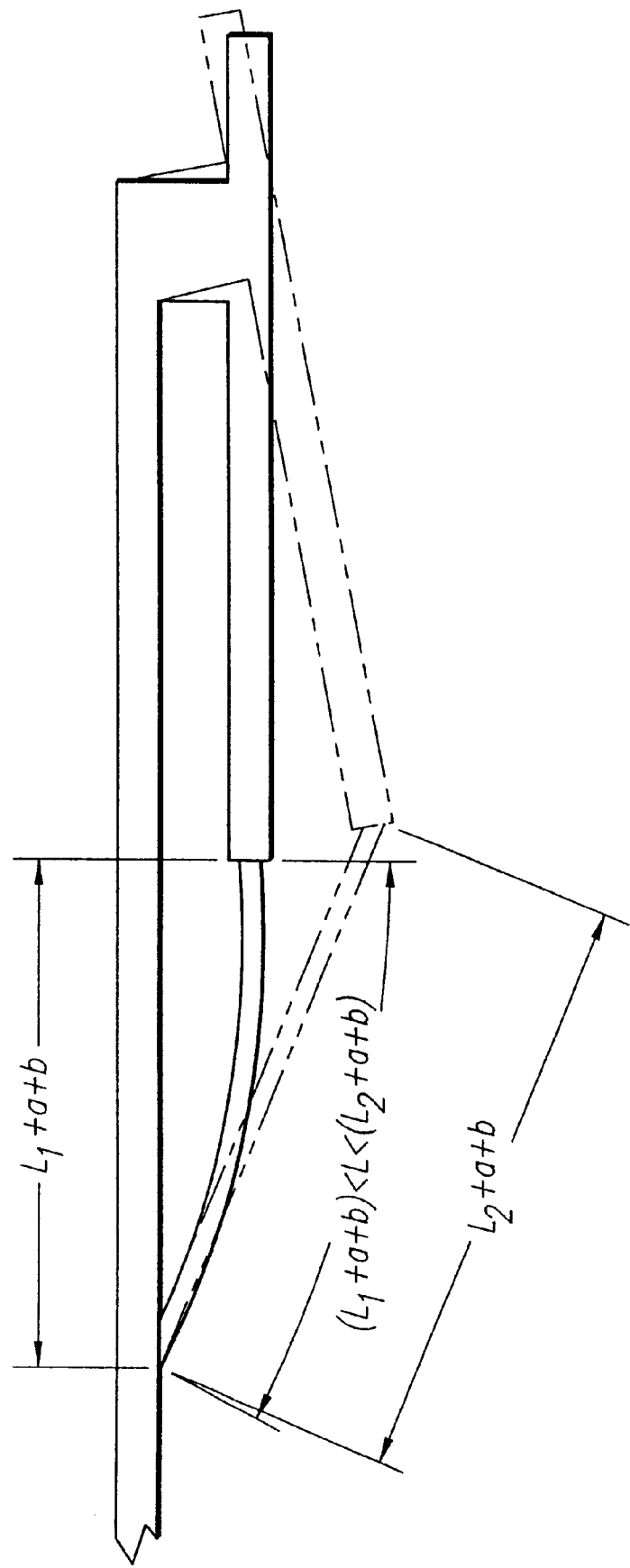

An alternative form of the invention is shown in FIGS. 4A and 4B. Like parts have like numbers to the previous Figures. The tether 72 in FIGS. 4A and 4B is bifurcated and comprises two segments 74, 76. The tether segments 74, 76 are separated along at least a portion of the length of the tether in the plane of the flexure outrigger frame 52 to effectively shorten the length of the tether in the plane of the outrigger frame from its elongated length when out of the plane of the flexure.

In both the FIGS. 3A, 3b and the 4A, 4B embodiments, the disk drive suspension tethers 56, 72 each comprise a separately defined portion of the flexure outrigger frame 52. Tethers 56, 72 have in common the principle that in the plane of the outrigger frame 52, which is typically the plane of the load beam from which the outrigger frame is fashioned, the tethers are extended a length $L_1$ but are in fact of a length, when extended or elongated, of $L_2$. When extended, as in the case of the flexure tongue portion 48 making an excursion out of the plane of the outrigger frame 52, the tethers 56, 72 will have a locally deflected shape having the length $L_2$.

FIGS. 3A, 3B, 4A, 4b and 5 illustrate the excursions permitted. In each instance there is the factor of the extended length $L_2$, the factor of the length of the connection between the sinuous or bifurcated portions of the tether and the frame, shown as "a", and the factor of the length of the connection between the sinuous or bifurcated portions of the tether and the tongue distal end, shown as "b". It will be observed with reference to FIG. 5 that the nominal length of the tether is $L_1+(a+b)$, but the extended length, and the limiting extent of the maximum excursion of the tongue is $L_2+(a+b)$.

The invention thus provides apparatus and method which modifies the disk drive suspension flexure frame in a manner to limit undue excursions of the flexure tongue by providing a tether of an elongatable shape that is of normal length in the plane of the flexure outrigger frame but extends to a second length upon an excursion of the flexure tongue portion carrying the slider, and without blocking twist of the flexure tongue, or complicating manufacturing operations since the entire tether is simply etched from the load beam or flexure material.

I claim:

1. Disk drive suspension comprising a load beam having a base for attachment to an actuator, a spring portion and a rigid portion, a flexure attached to said load beam rigid portion, said flexure comprising an outrigger defining frame and a tongue having a proximate end and a distal end, said flexure tongue proximate end being attached to said frame and movable therewith, said tongue distal end being movable independent of said flexure frame over a desired excursion range, and a spring steel tether, said tether comprising a locally curved, axially extended, unitary and separately defined portion of said frame that connects said tongue portion distal end to said flexure frame, said locally curved portion being straightenable to elongate said tether from a shorter length to a longer length as a function of said curved portion being straightened by excursion movement of said tongue distal end relative to said frame, whereby said tongue distal end moves freely within said desired excursion range but its movement beyond said desired excursion range is limited to the longer length of said tether as determined by the full straightening of the tether locally curved portion.

2. The disk drive suspension according to claim 1, in which said tether curved portion is sinuous and elongates by straightening the sinuous curves of said portion the elongatability of said tether being limited by the straightened extent of said curved portion to block tongue distal end excursions beyond said desired range.

3. The disk drive suspension according to claim 1, in which said tether curved portion is bifurcated to have two opposed bands that bow oppositely, the elongatability of said tether being limited by the straightened extent of said curved portion to block tongue distal end excursions beyond said desired range.

4. The disk drive suspension according to claim 1, in which said tether curved portion is intermediate the ends of said tether and constructed and arranged to elongate in response to flexure frame-independent movement of said tongue distal end within said desired range.

5. The disk drive suspension according to claim 1, in which said tether is free of interconnection with said load beam beyond said flexure frame.

6. The disk drive suspension according to claim 1, in which said flexure frame, flexure tongue, and tether comprise portions of a unitary web of spring steel.

7. The disk drive suspension according to claim 1, in which said excursion range subtends an angle of 0 to 3 degrees.

8. Disk drive suspension comprising a load beam having a base for attachment to an actuator, a spring portion and a rigid portion therebeyond, a flexure frame attached to said load beam rigid portion, a flexure tongue having a proximate end attached to said flexure frame and a distal end, said tongue distal end being movable independent of said flexure frame over a desired excursion range, and a spring steel tether, said tether comprising a locally curved, axially extended, unitary and separately defined portion of said frame that connects said tongue portion distal end to said flexure frame, said locally curved portion being straightenable to elongate said tether from a shorter length in which, said curved portion is curved to a longer length in which said curved portion is straightened in excursion limiting relation beyond said desired range.

9. The disk drive suspension according to claim 8, in which said tether comprises a separately defined portion of said flexure frame, said portion having a first dimension within said flexure frame and constructed and arranged to elongate beyond its said first dimension in response to movement of said tongue distal end through its excursion range.

10. The disk drive suspension according to claim 9, in which said tether comprising a separately defined portion of said flexure frame is sinuous along its length in the plane of said flexure frame for elongation as needed to tether said tongue distal end.

11. The disk drive suspension according to claim 9, in which said tether comprising a separately defined portion of said flexure frame is locally bifurcated into at least two segments, said tether segments being separated along at least a portion of the length of said tether in the plane of said flexure frame to effectively shorten the length of said tether in the plane of said flexure from its elongated length out of the plane of said flexure.

12. The disk drive suspension according to claim 9, in which said tether comprises a separately defined portion of said flexure frame that has a locally deflected shape having a length $L_2$ but extending over a shorter length $L_1$ within the plane of said flexure frame, said tether being elongatable to extend to its length L2 out of the plane of said flexure frame in response to excursions of said tongue distal end in tether connected relation.

13. The disk drive suspension according to claim 9, in which said tether comprises an elongatable connection between said flexure tongue distal end and said flexure frame, the elongatability of said connection being limited to block tongue distal end excursions beyond said desired range.

14. The disk drive suspension according to claim 13, in which said tether is free of interconnection with said load beam beyond said flexure frame.

15. The disk drive suspension according to claim 14, in which said flexure frame, flexure tongue, and tether comprise portions of a unitary web of spring steel.

16. The disk drive suspension according to claim 15, in which said excursion range subtends an angle of 0 to 3 degrees.

17. Disk drive suspension flexure comprising a spring metal frame and a spring metal tongue thereon having a proximate end and a distal end, said flexure frame having a spring metal extension comprising intermediate the extension ends a locally curved portion connected to said frame and to said tongue distal end and defining a tether attaching said frame to said tongue distal end, said locally curved portion comprising a flat metal band of greater length than its curved extent between said frame and said tongue distal end, said locally curved portion acting to reduce its curvature under tongue displacement within a predetermined excursion range until said locally curved portion is straight and blocks further tongue excursion, whereby tongue distal end excursions are limited by said tether.

18. The disk drive suspension flexure according to claim 17, in which said tether locally curved portion is locally deflected within the plane of said flexure to have a length $L_2$ extending over a shorter length $L_1$, said tether locally curved portion being elongatable to extend its length $L_2$ out of the plane of said flexure frame in response to excursions of said tongue distal end.

19. The method of limiting flexure tongue excursions from a spring metal flexure frame to within a desired range, including defining a locally curved section within said flexure frame that is elongatable by straightening the local curvature under the excursion movement of said flexure tongue, attaching said locally curved section to said flexure tongue portion undergoing the greatest excursions, and straightening said locally curved section to elongate said flexure frame section in response to tongue excursions to no more than the maximum elongation of said flexure frame section as defined by an absence of curvature in said locally curved portion.

* * * * *